Nov. 10, 1964 H. G. HUMMEL 3,156,785

TAPE EDITING AID

Filed March 1, 1961 3 Sheets-Sheet 1

HAROLD G. HUMMEL
INVENTOR.

BY Robert S. Clay

ATTORNEY

Nov. 10, 1964 H. G. HUMMEL 3,156,785

TAPE EDITING AID

Filed March 1, 1961 3 Sheets-Sheet 2

HAROLD G. HUMMEL
INVENTOR.

BY Robert G. Clay

ATTORNEY

Nov. 10, 1964 H. G. HUMMEL 3,156,785

TAPE EDITING AID

Filed March 1, 1961 3 Sheets-Sheet 3

HAROLD G. HUMMEL
INVENTOR.

BY Robert S. Clay

ATTORNEY

United States Patent Office 3,156,785
Patented Nov. 10, 1964

3,156,785
TAPE EDITING AID
Harold G. Hummel, Santa Clara, Calif., assignor to Ampex Corporation, Redwood City, Calif., a corporation of California
Filed Mar. 1, 1961, Ser. No. 92,499
13 Claims. (Cl. 179—100.2)

This invention relates to apparatus for preparing magnetic tape for editing, and particularly to such apparatus used in combination with magnetic tape recorders.

In cutting and splicing strips bearing recorded information, it is usually desired to make the joint fall at a precise point in the recorded array. In motion picture films the joint is made at the top or bottom of a picture frame and never in the middle. But the motion picture editor has an easy task because he can see the pictures on the film. Information recorded on magnetic film is not visible to the eye, and the problem of locating the precise points for making cuts has always been difficult of solution.

Television signals including picture information are ordinarily recorded on magnetic tape in discrete blocks termed "fields," each field block comprising a plurality of horizontal lines separated by vertical scan intervals and containing all the information needed to control one complete scan of the reproducing cathode ray beam from top to bottom of the picture tube display screen. Thus, each field block is analogous to a picture on a motion picture film, and it follows that cuts should be made on the magnetic tape at the boundaries between field blocks. These boundaries are defined by zones termed "vertical blanking zones," generally of more than one transverse track width in the direction of the tape length, and constituting zones in which the picture singal is interrupted to give time for the cathode ray beam to traverse vertically from the bottom of the display screen to the top, after finishing one field and before beginning another. Thus, on the tape, the picture signal interruptions represented by the vertical blanking zones are the positions where cuts are made and, if these zones were visible, the editing job would be simplified.

It is an object of this invention to provide means to visibly indicate the recorded locations of periodically repeated portions of a signal on a magnetic tape.

It is another object of this invention to provide apparatus cooperating with a tape recorder to produce such indications during the recording process.

It is still another object of this invention to provide such apparatus operable manually and semi-automatically or, alternatively, fully automatically to produce such indications, the apparatus being easy and accurate of adjustment and convenient in use to produce the effect desired.

It is a further object of this invention to provide apparatus coordinating the locations of visible indices and recorded vertical blanking zones on a magnetic tape during the recording of a television program, for convenience in subsequent editing of the tape.

A tape editing aid, in accordance with the present invention, satisfies these and other purposes by making use of a magnetic tape pre-printed with visible index marks spaced along the length of the tape at intervals corresponding to the spacing at which the vertical blanking zones fall when recorded. A stroboscopic lamp is mounted to illuminate the index marks whenever a vertical blanking zone is recorded on the tape. The speed of the tape is manually controlled to ensure that one of the index marks is under the recording head gap at the instant when the lamp flashes. Thus, the blanking zone is recorded at the index mark. Alternatively, a sensitive means such as a photoelectric cell is mounted to view each index mark as it passes, the cell being connected to control the speed of the tape and to automatically perform the desired coordination.

Other objects and advantages of the invention will be explained in the following specification, considered together with the accompanying drawings, in which.

Figure 1:
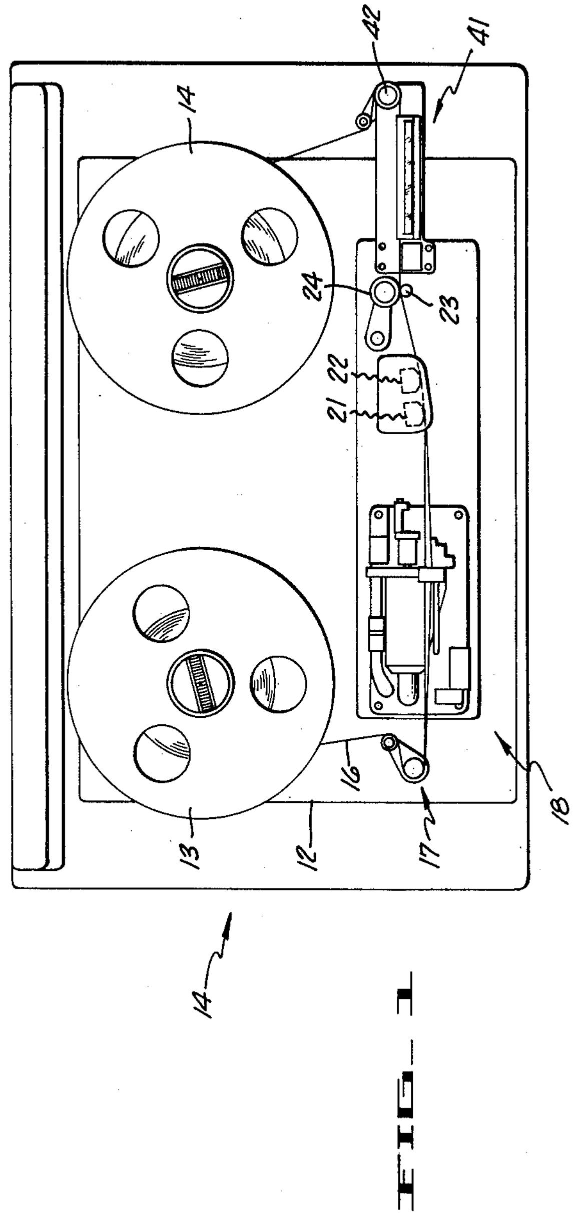
FIGURE 1 is a plan view of a standard television recorder on which the apparatus of the invention has been mounted.

Referring now to FIGURE 1, there is shown a magnetic tape television recording apparatus 11 having a chassis top panel 12 on which are mounted a pair of supply and takeup reels 13 and 14, respectively, forming part of the transport for a magnetic tape 16. During the recording process, the tape 16 is drawn from the supply reel 13 around an idler assembly 17, past a rotary-drum magnetic head assembly 18, past a pair of fixed longitudinal-track transducing heads 21 and 22. A combination of a capstan 23 and cooperating pinch roller 24, provides the driving forces to move the tape. From the capstan 23 the tape 16 is drawn through an apparatus 41, forming a part of the structure of the invention, and around an idler 42 to the takeup reel 14, which is operated to provide sufficient tension to take up the tape.

A more detailed description of the recorder, excluding the apparatus 41, is given in United States Patent No. 2,942,061, issued June 21, 1960 for "Tape Transducing Apparatus" by Robert Fred Pfost et al.

Figure 2:
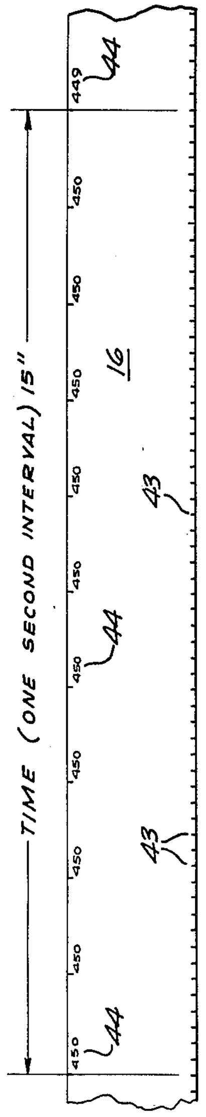
FIGURE 2 is an enlarged view of a segment of the magnetic tape of FIGURE 1, showing a portion of a structure of the invention.

Referring now to FIGURE 2 there is shown a reduced segment of the tape 16 bearing, along one side of the tape, a series of longitudinally spaced pre-printed index marks 43. It will be understood that the tape is normally moved at a rate of fifteen inches per second through the recording head assembly 18, and that the vertical blanking zones of the television signal have a normal period of sixty per second, so that when the vertical blanking zones are recorded on the tape they are spaced at intervals of one-fourth inch. Accordingly, the index marks 43 are spaced at intervals of one-fourth inch. Also pre-printed on the opposite longitudinal side of the tape 16 are a series of indexing numerals 44 in serial order, here shown as spaced one and one-half inches apart, so that each group of ten of these numerals represents the passage of one second in time when the tape is moving. The numbers in each group of ten are exactly the same, so that under the stroboscope the same number shows up in a seemingly stationary position for one entire second in time. These numerals 44 are useful for locating general zones of the tape during the editing process.

It will be seen that the index marks 43 represent means on the tape 16 for indicating the positions of the interruptions of the television picture signal (vertical blanking zones) when the signal is recorded so that, when it is subsequently desired to cut and splice the tape at some of these vertical blanking zones, the cuts can be made precisely at the corresponding marks 43, and the editor is then assured that the cut is being made through the vertical blanking zones.

Figure 3:
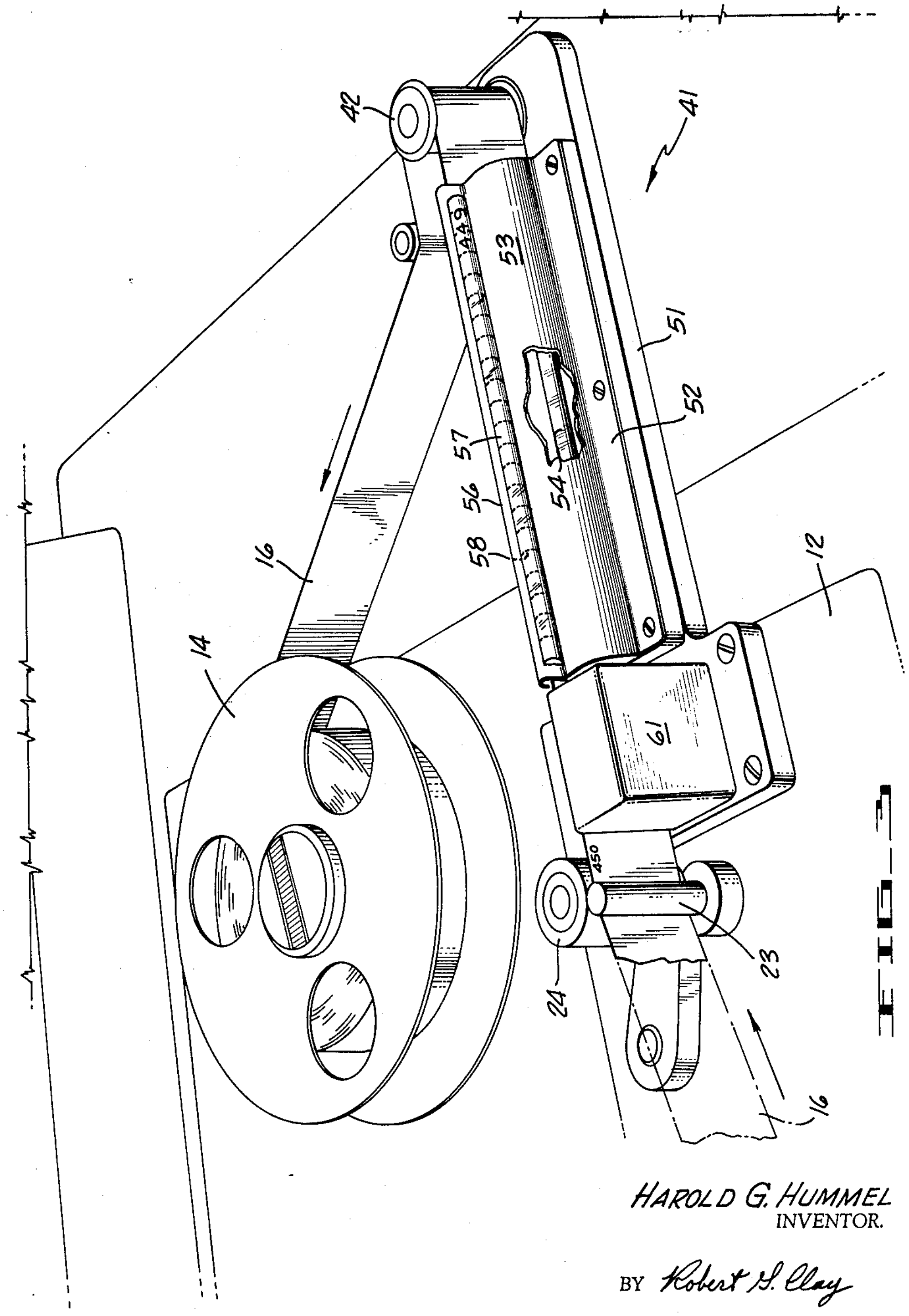
FIGURE 3 is an enlarged perspective view of a portion of the apparatus as shown in FIGURE 1.

Referring now to FIGURE 3, some details of the apparatus 41 are shown and include a base plate 51 solidly mounted on the recorder top panel 12 to form a support for the idler 42, which is of standard manufacture. Between the idler 42 and the capstan 23, there is vertically mounted on the base plate 51 a frame 52 having a lower shield portion 53 conforming to the shape of an elongated stroboscopic lamp 54. The lamp is mounted behind the shield portion 53 (as seen from the front, as in FIGURE 3) so that the flashing of the lamp is only indirectly visible to the operator of the machine. Above the shield portion 53 the frame 52 is formed into an elongated window portion 56 in which is set a magnifying lens 57. The lens 57 has inscribed reference marks 58, spaced one-fourth inch apart, such as the spacing of the index marks 43 on the tape 16. The lens 57 is so angled that the operator can see both the index marks 43 and the numerals 44 whenever they are instantaneously illuminated by a flash of the lamp 54.

As an important feature of the invention, each reference mark 58 is spaced a predetermined distance along the actual path of the tape 16 and from the precise location of the recording head in assembly 18, the spacing being precisely an integer multiple of the one-fourth inch spacing between the index marks 43. Thus, whenever one of the index marks 43 is precisely opposite the recording head in assembly 18, all of the reference marks 58 are precisely aligned with corresponding index marks 43 behind the lens 57.

The apparatus 41 also includes a housing 61, here shown mounted on the base plate 51 adjacent the capstan 23 and opening toward the rear of the structure (away from the viewer as seen in FIGURE 3). This housing 61 includes a combination of photoelectric cell 62 and illuminating lamp 63 (to be described in greater detail in connection with FIGURE 4, hereinafter) for use in the fully automatic mode of operation of the invention.

Figure 4:
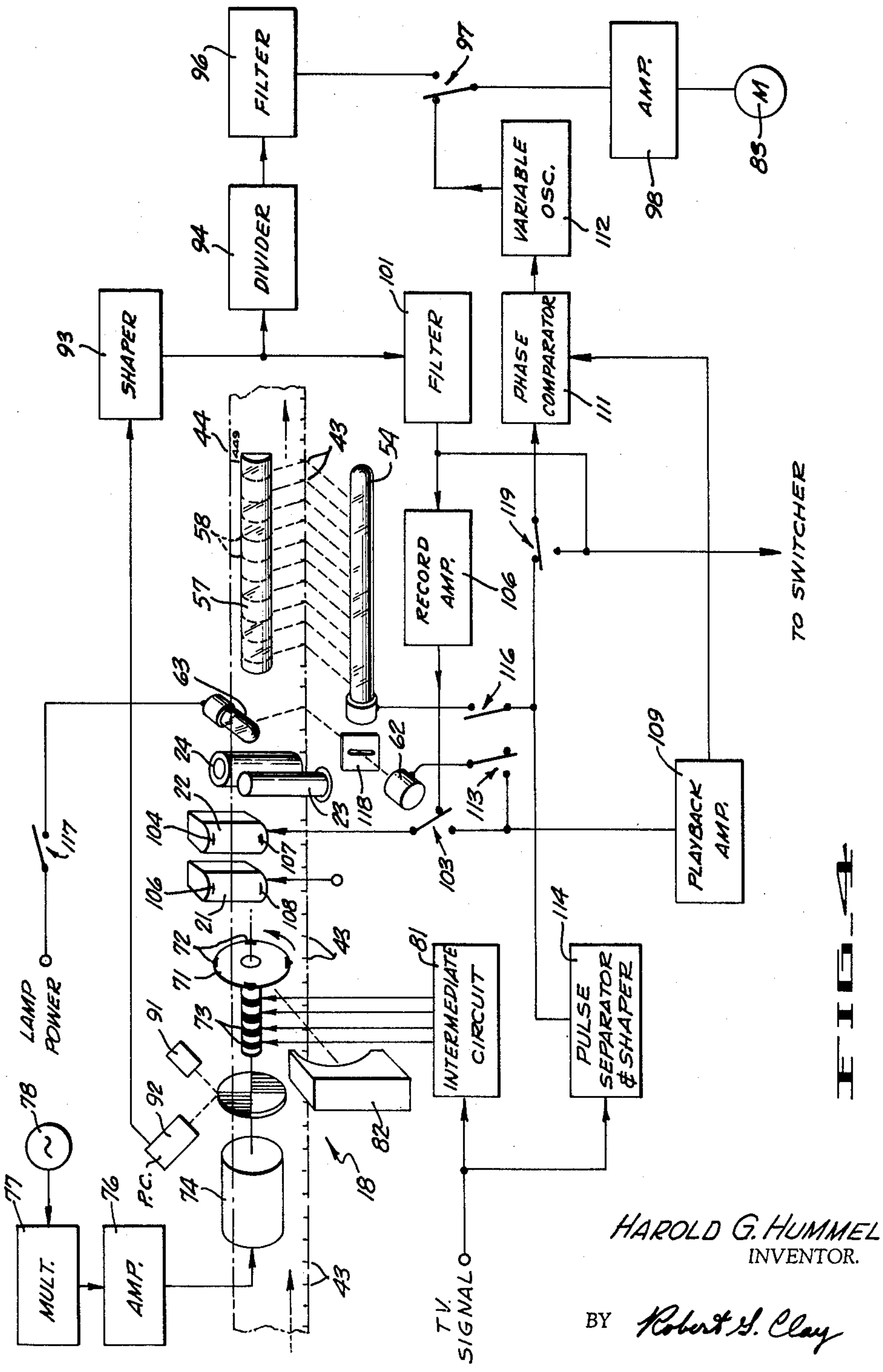
FIGURE 4 is a schematic diagram showing the structure and circuits of the invention.

In FIGURE 4 there are schematically shown various portions of the recorder 11 and related portions of the structure of the present invention. First there will be described that portion of the record 11 that is disclosed in United States Patent No. 2,942,061 and the operation thereof as it is operated without the apparatus of the present invention.

The rotating head assembly 18 of the recorder 11 has a transducing disk 71 on which are mounted four quadratically spaced transducing heads 72 electrically connected to a commutator 73 mounted on the same axis as the disk 71. The disk 71 is driven in rotation on an axis parallel to the direction of tape motion by means of a synchronous motor 74 connected through an amplifier 76 and multiplier 77 to a control frequency source 78, which provides a constant frequency drive for the motor 74. As shown, the incoming television signal is fed to the heads 72 through the commutator 73 and an intermediate circuit 81. A female guide 82 is positioned opposite to the disk 71 to hold the tape 16 against the heads as they rotate, so that the television signal is recorded transversely on the tape in a series of parallel tracks as the tape is drawn in an axial direction past the heads. The speed of the capstan 23 in moving the tape is controlled by a synchronous motor 83, shown schematically at the right of the drawing. The speed of the motor 83 is controlled in the following manner. On the same shaft as the disk 71, there is firmly mounted a disk 84 having alternate light and dark zones illuminated during rotation by a lamp 91 and viewed in rotation past a predetermined point by a photocell 92. A pulsed signal is then generated at the photocell 92 having a frequency corresponding to the rotational speed of the disk 71. The signal from the photocell 92 is fed to a shaper 93 and thence to frequency divider 94 and to a filter 96. From such filter 96 the signal is applied through a switch 97 to an amplifier 98 and thence to the motor 83. Thus during the recording process the speed of the motor 83 and of the capstan is fixed to correspond with the speed of rotation of the heads 72, which are driven by the fixed frequency source 78. During the recording process the signal from the shaper 93 is also fed to a filter 101 and a record amplifier 102 and through a switch 103 to a control track head 104 associated with an erase head 106, so that pulses are recorded linearly along the margin of the tape for use in timing the apparatus during playback. The audio signal is recorded by a head 107, preceded by an erase head 108 on a similar longitudinal track.

During playback operation the control track signal is read by the head 104, which is connected through switch 103 to a playback amplifier 109 and to a phase comparator 111, while the signal from the shaper 93 and filter 101 is fed through a switch 119 to the phase comparator 111. The comparator 111 produces a signal indicating the discrepancy of phase between the signal produced by disk 84 and the signal produced by head 104, and the comparator output signal is applied to a variable oscillator 112, which is in turn connected through switch 97 to the amplifier 98 and motor 83. Thus the speed of the motor 83 is adjusted to drive the capstan 23 and tape at just the right rate to maintain the signal from head 104 in precise phase with the signal from disk 84.

The functioning of all of the above-described portions of the standard structure is described more in detail in United States Patent No. 2,942,061, previously referred to.

The apparatus of the invention is used in combination with the recorder as above-described for the purpose of producing a recorded tape on which the vertical blanking zones are precisely indicated by the visible index marks 43. Subsequently an editor can cut and piece the tape in different arrangements and, in making his cuts, can cut at the index marks with the assurance that he is cutting through the recorded vertical blanking zones of the tape. To produce such a tape, the apparatus of the invention is connected to control the recording operation of the recorder and to ensure that the blanking zones are recorded at the index marks. The connection of the invention to the recorder is made in two ways: (1) for manual operation; and (2) for fully automatic operation, as follows.

For manual operation, the stroboscopic lamp 54 is connected to a pulse separator and shaper 114, through a switch 116. The pulse shaper 114 is connected to the incoming television signal line and provides a signal to flash the stroboscopic lamp 54 each time a vertical blanking zone appears in the television signal. Each time the lamp 54 flashes, the index marks 43 are momentarily illuminated and the actual positions of the index marks 43 with respect to the reference marks 58 on lens 57 are displayed. The lamp flashes sufficiently rapidly that if the tape is moving at a speed of exactly fifteen inches per second, the reference marks 43 appear to be standing still behind the lens 57. If the two sets of marks 43 and 58 are not precisely aligned, the speed of the tape is changed by manual adjustment (see below); and when the marks 43 have moved into precise alignment with the marks 58, the speed of the tape is re-established, again by manual adjustment, at precisely fifteen inches per second.

For such manual adjustment, the switch 97 is thrown to connect amplifier 98 with variable oscillator 112; and the frequency of the oscillator 112 is altered by means of manual controls that are provided thereon as standard equipment. The change in frequency of the oscillator produces a corresponding change in the speeds of the motor 83 and of the capstan 23. The tape is moved at a faster or slower rate until the index marks 43 are aligned with the reference marks 58. The oscillator 112 is then re-established at a frequency corresponding with movement of the tape at fifteen inches per second; and the switch 97 may then be re-thrown to connect amplifier 98 with filter 96, if desired.

For completely automatic operation of the apparatus of the invention, the stroboscopic lamp 54 is disconnected as by opening of the switch 116; and the lamp 63 is turned on as by closing of a switch 117 connected to a source (not shown) of lamp power. The lamp 63 provides constant illumination of the tape index marks 43 in passage. The photoelectric cell 62 views the passing illuminated marks 43 through a slitted mask 118, so that each time a mark 43 passes the slit in the mask 118, a pulse is sent from the photocell. The slit in the mask 118 is spaced from the head disk 71 for a distance along the actual path of the tape that is an integer multiple of the one-fourth inch spacing between the index marks 43. Thus, whenever a pulse is sent by the photocell 62, one of the marks 43 is precisely opposite one of the heads 72.

The pulses from photocell 62 are sent through a switch 113 to the playback amplifier 109, and thence to one of the input terminals of the phase comparator 111. The input portion of the phase comparator 111 is adapted, as by means of ringing oscillators (not shown), to convert 60-cycle signals (such as the signal from photocell 62) into 240-cycle signals for which the phase comparator 111 is designed.

The 60-cycle output from the pulse separator and shaper 114 is fed through a switch 119 to the other input terminal of the phase comparator 111. The switch 119, when operated to make this connection, also serves to disconnect the phase comparator 111 from the filter 101.

Thus the phase comparator 111 is connected to receive the signal from pulse separator 114, each pulse of which indicates the arrival of a vertical blanking zone at the magnetic recording head and the recording of the zone on the tape; and the comparator 111 is also connected to receive the signal from photocell 62, each pulse of which represents the arrival of one of the index marks 43 at the magnetic recording head. If these signals are precisely in phase, then it follows that the vertical blanking zones are being recorded on the tape precisely at the index marks 43. If the two signals are out of phase, indicating that the vertical blanking zones are not being recorded at the idex marks 43, then the phase comparator 111 provides a corrective output signal to the variable oscillator 112, which in turn is connected through switch 97 to the amplifier 98 and capstan drive motor 83. The speed of the capstan and tape is thus altered until the index marks 43 do arrive at the recording head at the same instants as the vertical blanking zones, causing the signals to the phase comparator 111 to again coincide in phase. The capstan drive motor is then automatically returned to operation at the speed necessary to drive the tape at precisely fifteen inches per second. It will be seen that any tendency for the blanking zones to be recorded out of registration with the marks 43 is instantly and automatically compensated by the comparator 111 and oscillator 112.

It will be readily seen that means other than that represented by the photocell 62 and lamp 63 may be used to sense the passage of the index marks 43 without departing from the scope of the invention. For example, marks suitable for electrostatic sensing might be used, the important feature being that the marks 43, in whatever form they are imprinted, be also visible to the eye for subsequent use in editing the tape.

Thus there has been described an apparatus usable with a recording system of the class having a magnetic tape movable at selectively variable speeds past a recording head, the recording system being arranged to receive and record a signal having periodic interruptions, and the apparatus including index marks pre-printed on the tape to indicate where the interruptions are to be recorded, and a means connected to receive the incoming signal so as to provide an indication wherever one of the interruptions is in fact recorded, so that the speed of the tape can be controlled to bring one of the marks into alignment with the recording head whenever an interruption is recorded on the tape.

What is claimed is:

1. In combination with a recording system of the class having a magnetic tape movable at controllable speeds past a recording head for recording a signal having successive video portions followed by interruptions of constant time period, said tape having equispaced indicia, the combination comprising: means connected to receive said signal for providing an indication whenever one of said interruptions occurs; and means for comparing said indicia and said indications to control said tape speed and to bring said indicia into phase with said indications at said head.

2. In combination with a recording system of the class having a magnetic tape movable at controllable speeds past a recording head for recording a signal having successive video portions followed by interruptions of constant time period, said tape having equispaced indicia, the combination comprising: pulse forming means connected to receive said signal for providing an electrical pulse whenever one of said interruptions occurs; and means for comparing said indicia and said pulses to control said tape speed and to bring said indicia into phase with said pulses at said head.

3. In combination with a recorder of the class having a magnetic tape movable at controllable speeds past a recording head for recording a signal having successive video portions followed by interruptions of constant time period, said tape having equispaced indicia, the combination comprising: pulse forming means connected to receive said signal for providing a first electrical pulse whenever one of said interruptions occurs; means positioned adjacent the path of said tape and responding to said indicia for producing a second electrical pulse whenever one of said indicia is positioned at said recording head; and means coupled to said first and second named means for receiving said pulses and for comparing the phases thereof, said last named means being coupled to said recorder for controlling said tape speed to bring said pulses into phase.

4. In combination with a recording system of the class having a magnetic tape movable at controllable speeds past a recording head for recording a signal having characteristic interruptions of constant time period, the combination comprising: equispaced indicia on said tape, and means connected to receive said signal for providing an indication whenever one of said interruptions occurs, whereby said tape speed may be controlled to position one of said indicia at said head whenever one of said interruptions occurs.

5. In combination with a recording system of the class having a magnetic tape movable at controllable speeds past a recording head for recording a signal having characteristic interruptions of constant time period, the combination comprising: permanent visible indicia equispaced on said tape; and means connected to receive said signal for providing a temporary visible indication whenever one of said interruptions occurs; whereby said tape speed may be controlled so as to bring one of said indicia into registration with said head when said last named means is indicating the occurrence of one of said interruptions, thereby causing said indicia to provide permanent visible indications on the recorded locations of said interruptions for subsequent editing of said tape.

6. In combination with a recording system of the class having a magnetic tape movable at controllable speeds past a recording head for recording a signal having characteristic interruptions of constant time period, the combination comprising: means on said tape for indicating where said interruptions are to be recorded; means connected to receive said signal for indicating when said interruptions are recorded; and means connected to said last named means and to said system for sensing the passage of said first named means and for controlling said tape speed so as to bring said first named means into phase with said head at the instant each of said interruptions is being recorded.

7. In combination with a recording system of the class having a magnetic tape movable at controllable speeds past a recording head for recording a signal having periodic interruptions, the combination comprising: a plurality of index marks pre-printed at regular intervals on said tape; a flashing lamp mounted alongside said tape and directed to illuminate said index marks; and means connected to receive said signal and to cause said lamp to flash as each of said interruptions is recorded by said head, whereby the speed of said tape can be controlled so as to cause each of said signal interruptions to be recorded at one of said index marks.

8. In combination with a recording system of the class having a magnetic tape movable at controllable speeds past a recording head for recording a signal having periodic interruptions, the combination comprising: a plurality of index marks pre-printed at regular intervals on said tape; a reference mark on said system alongside said tape and spaced from said head for a multiple of said intervals; a flashing lamp mounted alongside said tape and directed to illuminate said index marks in the vicinity of said reference mark; and means connected to receive said signal and to cause said lamp to flash as each of said interruptions is recorded by said head, whereby the speed of said tape can be controlled so as to cause each of said signal interruptions to be recorded at one of said index marks.

9. In combination with a recording system of the class having a magnetic tape movable at controllable speeds past a recording head for recording a signal having periodic interruptions, said tape having a plurality of index marks pre-printed at regular intervals thereon, the combination comprising: a photoelectric cell mounted alongside said tape and directed to view said tape and to produce a first pulse for the passage of each of said index marks; means connected to receive said signal and to produce a second pulse as each of said interruptions is recorded by said head; and means connected to said system, to said last named means and to said photoelectric cell for receiving and comparing the phases of said pulses and for controlling the speed of said tape so as to cause one of said index marks to be at said head whenever one of said interruption is being recorded.

10. In combination with a recording system of the class having a magnetic tape movable at controllable speeds past a recording head for recording a signal having periodic interruptions, the combination comprising: a plurality of index marks pre-printed at regular intervals on said tape; a photoelectric cell mounted alongside said tape and directed to view said tape and to produce a first pulse for the passage of each of said index marks; means connected to receive said signal and to produce a second pulse as each of said interruptions is recorded by said head; and means connected to said system, to said last named means and to said photoelectric cell for receiving and comparing the phases of said pulses and for controlling the speed of said tape so as to cause one of said index marks to be at said head whenever one of said interruptions is being recorded.

11. The combination as described in claim 10, wherein said photoelectric cell is spaced from said head for a multiple of said intervals and wherein said comparing means controls the speed of said tape so as to cause coincidence of said first and second pulses.

12. In combination with a recording system of the class having a magnetic tape movable past a recording head for recording a primary signal having periodic interruptions, said system including means for receiving a pair of input signals and comparing the phases of said input signals to vary the speed of said tape as a function of the phase difference between said input signals, and said tape having a plurality of index marks pre-printed at regular intervals thereon, the combination comprising: a mask having a slit formed therein and mounted alongside said tape with said slit spaced from said recording head for a distance corresponding to a multiple of said intervals; a photoelectric cell mounted to view said index marks in passage before said slit and functioning to produce a first pulse at the instant each index mark passes said slit, said photoelectric cell being connected to said signal comparing means to supply said first pulses thereto as one of said pair of input signals; and pulse forming means connected to receive said primary signal and to produce a second pulse at the instant each of said interruptions is received by said pulse forming means and by said head for recording on said tape, said pulse forming means being connected to said comparing means to supply said second pulses thereto as the other of said pair of input signals; whereby said tape speed is varied in accordance with the phase difference between said first and second pulses so as to bring and to maintain said first and second pulses in synchronous phase relation, thereby insuring that said primary signal interruptions are each recorded precisely at corresponding index marks on said tape.

13. In combination with a recording system of the class having a magnetic tape movable past a recording head for recording a primary signal having periodic interruptions, said system including means for receiving a pair of input signals and comparing the phases of said input signals to vary the speed of said tape as a function of the phase difference between said input signals, the combination comprising: a plurality of index marks pre-printed at regular intervals on said tape; a mask having a slit formed therein and mounted alongside said tape with said slit spaced from said recording head for a distance corresponding to a multiple of said intervals; a photoelectric cell mounted to view said index marks in passage before said slit and functioning to produce a first pulse at the instant each index mark passes said slit, said photoelectric cell being connected to said signal comparing means to supply said first pulses thereto as one of said pair of input signals; and pulse forming means connected to receive said primary signal and to produce a second pulse at the instant each of said interruptions is received by said pulse forming means and by said head for recording on said tape, said pulse forming means being connected to said comparing means to supply said second pulses thereto as the other of said pair of input signals; whereby said tape speed is varied in accordance with the phase difference between said first and second pulses so as to bring and to maintain said first and second pulses in synchronous phase relation, thereby insuring that said primary signal interruptions are each recorded precisely at corresponding index marks on said tape.

References Cited in the file of this patent

UNITED STATES PATENTS

| | | |
|---|---|---|
| 2,627,596 | Andrews | Feb. 13, 1953 |
| 2,773,120 | Masterson | Dec. 4, 1956 |
| 2,938,731 | Meyer | May 31, 1960 |

OTHER REFERENCES

RCA TN No. 20, August 9, 1957, 178-6.6A; published by RCA Laboratories, Princeton, N.J.